United States Patent
Kurian et al.

(10) Patent No.: US 11,108,654 B2
(45) Date of Patent: Aug. 31, 2021

(54) RE-DEPLOYABLE ELASTIC FRAMEWORK

(71) Applicant: BANK OF AMERICA CORPORATION, Charlotte, NC (US)

(72) Inventors: Manu Kurian, Dallas, TX (US); Paul Roscoe, Flintshire (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 59 days.

(21) Appl. No.: 16/511,975

(22) Filed: Jul. 15, 2019

(65) Prior Publication Data

US 2021/0021488 A1    Jan. 21, 2021

(51) Int. Cl.
     *H04L 12/24*      (2006.01)

(52) U.S. Cl.
     CPC .......... *H04L 41/5045* (2013.01); *H04L 41/16* (2013.01); *H04L 41/20* (2013.01); *H04L 41/28* (2013.01)

(58) Field of Classification Search
     CPC .. H04L 41/5041–41/5054; H04L 41/16–41/28
     See application file for complete search history.

(56) References Cited

U.S. PATENT DOCUMENTS

| | | | |
|---|---|---|---|
| 5,491,796 A | 2/1996 | Wanderer et al. | |
| 6,868,441 B2 | 3/2005 | Greene et al. | |
| 7,283,935 B1 | 10/2007 | Pritchard et al. | |
| 7,401,131 B2 | 7/2008 | Robertson et al. | |
| 7,516,221 B2 | 4/2009 | Souder et al. | |
| 7,584,281 B2 | 9/2009 | Bernardin et al. | |
| 7,765,552 B2 | 7/2010 | Miller et al. | |
| 7,870,568 B2 | 1/2011 | Bernardin et al. | |
| 7,882,200 B2 | 2/2011 | Sturrock et al. | |
| 8,140,624 B2 | 3/2012 | Gingell et al. | |
| 8,140,666 B2 | 3/2012 | Dias et al. | |
| 8,195,739 B2 | 6/2012 | Bernardin et al. | |
| 8,655,997 B2 | 2/2014 | Eilam et al. | |
| 8,843,939 B2 | 9/2014 | Lesandro et al. | |

(Continued)

OTHER PUBLICATIONS

Su et al, "SLA-aware Tenant Placement and Dynamic Resource Provision in SaaS", 2015, IEEE International Conference on Web Services, pp. 615-622 (Year: 2015).*

(Continued)

*Primary Examiner* — Clayton R Williams
(74) *Attorney, Agent, or Firm* — Michael A. Springs; Moore & Van Allen PLLC; Nicholas C. Russell

(57) ABSTRACT

The invention relates generally to an improved application structure that allows for layered governance of different or competing functions within a micro application services framework. A segmented layering allows both a horizontal array and a vertical array to build a three dimensional mesh application structure to support multiple services. Each service is supported by base and foundation layers that may be technology agnostic and allow for adaptation according to technological progression or policy evolvement without the need to alter the core micro application services framework. The collection of the framework and supporting layers can be encapsulated into nodes, and a collection of nodes can be grouped into a container hub. Nodes may draw learned behaviors from other nodes, and can isolate themselves when necessary.

20 Claims, 6 Drawing Sheets

(56) References Cited

U.S. PATENT DOCUMENTS

| | | | |
|---|---|---|---|
| 9,009,294 B2* | 4/2015 | Dawson | H04L 41/0896 |
| | | | 709/224 |
| 9,542,222 B2* | 1/2017 | Mousseau | G06F 9/50 |
| 9,684,534 B2 | 6/2017 | Mandava et al. | |
| 10,027,768 B2 | 5/2018 | Rao | |
| 2002/0123365 A1 | 9/2002 | Thorson et al. | |
| 2002/0143949 A1 | 10/2002 | Rajarajan et al. | |
| 2003/0120502 A1 | 6/2003 | Robb et al. | |
| 2003/0182162 A1 | 9/2003 | Stevens | |
| 2004/0205101 A1 | 10/2004 | Radhakrishnan | |
| 2014/0279201 A1* | 9/2014 | Iyoob | G06F 9/5077 |
| | | | 705/26.7 |
| 2015/0350101 A1* | 12/2015 | Sinha | G06F 9/45533 |
| | | | 709/226 |
| 2018/0225149 A1* | 8/2018 | Bianchini | G06F 9/5016 |
| 2020/0014607 A1* | 1/2020 | Gangadhar | H04L 41/16 |

OTHER PUBLICATIONS

Selvi et al, "A Review On Service Level Agreement and SLA Based Resource Provisioning in Cloud Computing", 2016, International Journal of Computer Science and Mobile Computing, pp. 783-788 (Year: 2016).*

* cited by examiner

RE-DEPLOYABLE ELASTIC FRAMEWORK

FIELD

The present invention relates to an application structure that allows for layered governance of different or competing functions within a micro application services framework that allows for adaptable implementation of services and optimization of resources.

BACKGROUND

Organization's institute systems and procedures for managing multiple application services that may share a resource load and exhibit redundant functionality. These systems and procedures may change over time and require the underlying services to adapt or change based on implemented technological advancement or policy change. However, improved systems and procedures for implementing adaptable frameworks for application service deployment is needed.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the invention comprise systems, computer implemented methods, and/or computer program products for a re-deployable elastic framework structure for deployment of micro-business services ("MBS services"). The invention generally comprises generating a foundation layer and a core layer for deploying one or more micro-service solutions, wherein the foundation and core layers support one or more additional layers; receiving one or more micro-service solutions for deployment and categorize the one or more micro-service solutions based on capabilities, data usage, and deployment requirements for the micro-service solutions; generating a node, wherein in the node comprises assigning multiple of the one or more micro-service solutions to the node based on shared capabilities, data usage and shared deployment requirements; deploying an elastic framework, wherein the elastic framework includes the foundation layer, the core layer, one or more additional layers, and one or more node layers, wherein the node layer comprises one or more nodes; receiving a request to add an additional micro-service; assigning the additional micro-service solution to one of the one or more nodes; and automatically re-deploying the elastic framework, wherein the re-deployed elastic framework comprises an updated node layer.

In further accord with embodiments of the invention, the foundation layer and the core layer may be technology agnostic.

In other embodiments the invention, the one or more additional layers further comprise a support layer, a security layer, and a control layer.

In still other embodiments the one or more nodes and their underlying micro-service solutions are analyzed using a machine learning algorithm to determine shared capabilities, data usage and deployment requirements.

In further embodiments, each of nodes may be operated either independently and in conjunction with other nodes.

In further embodiments, the nodes are linked together in order to share data usage and deployment requirements.

In further embodiments, wherein the one or more nodes may be configured to initiate self-isolation based on the existence of an identified security condition.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
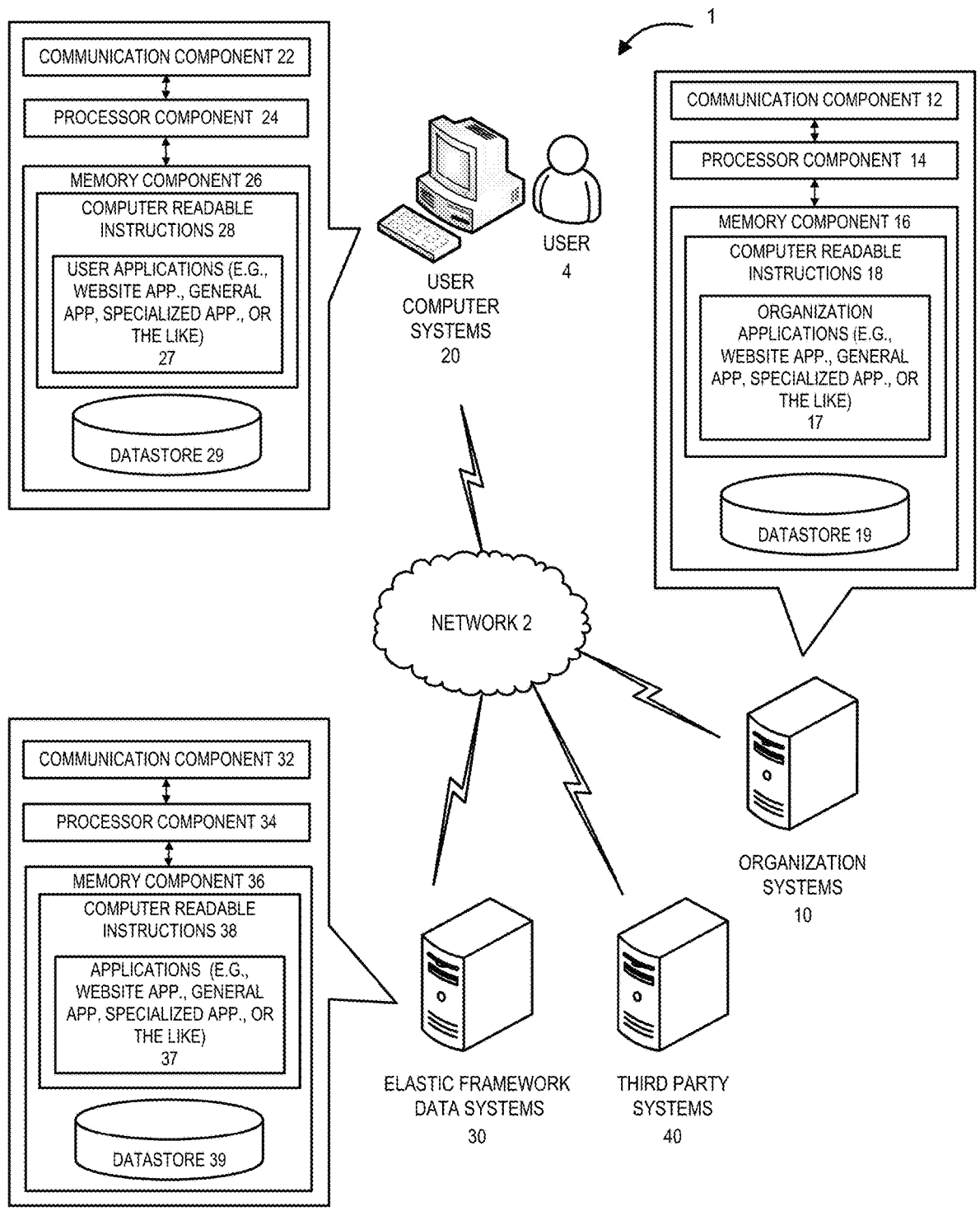
Figure 2:
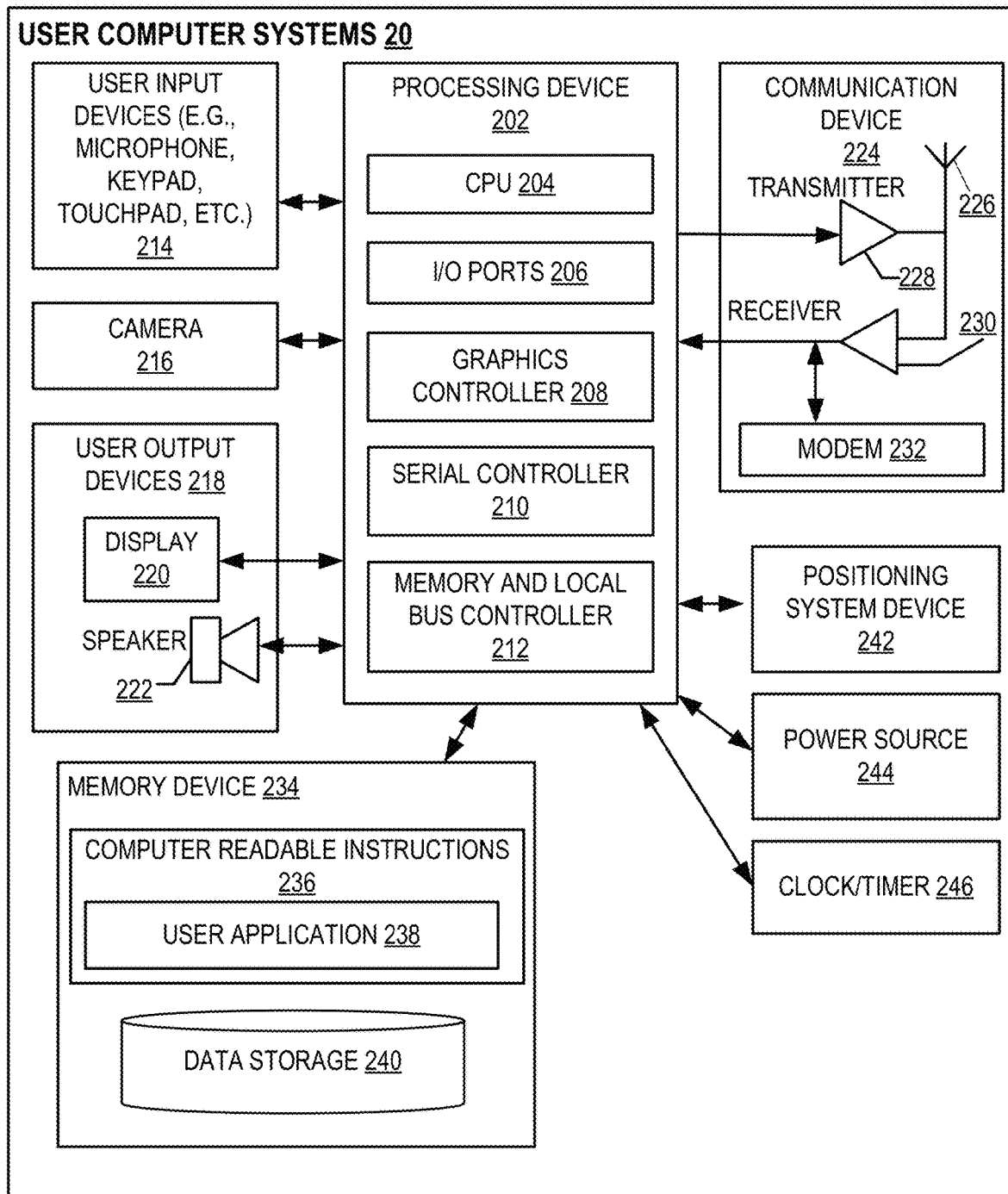
Figure 3:
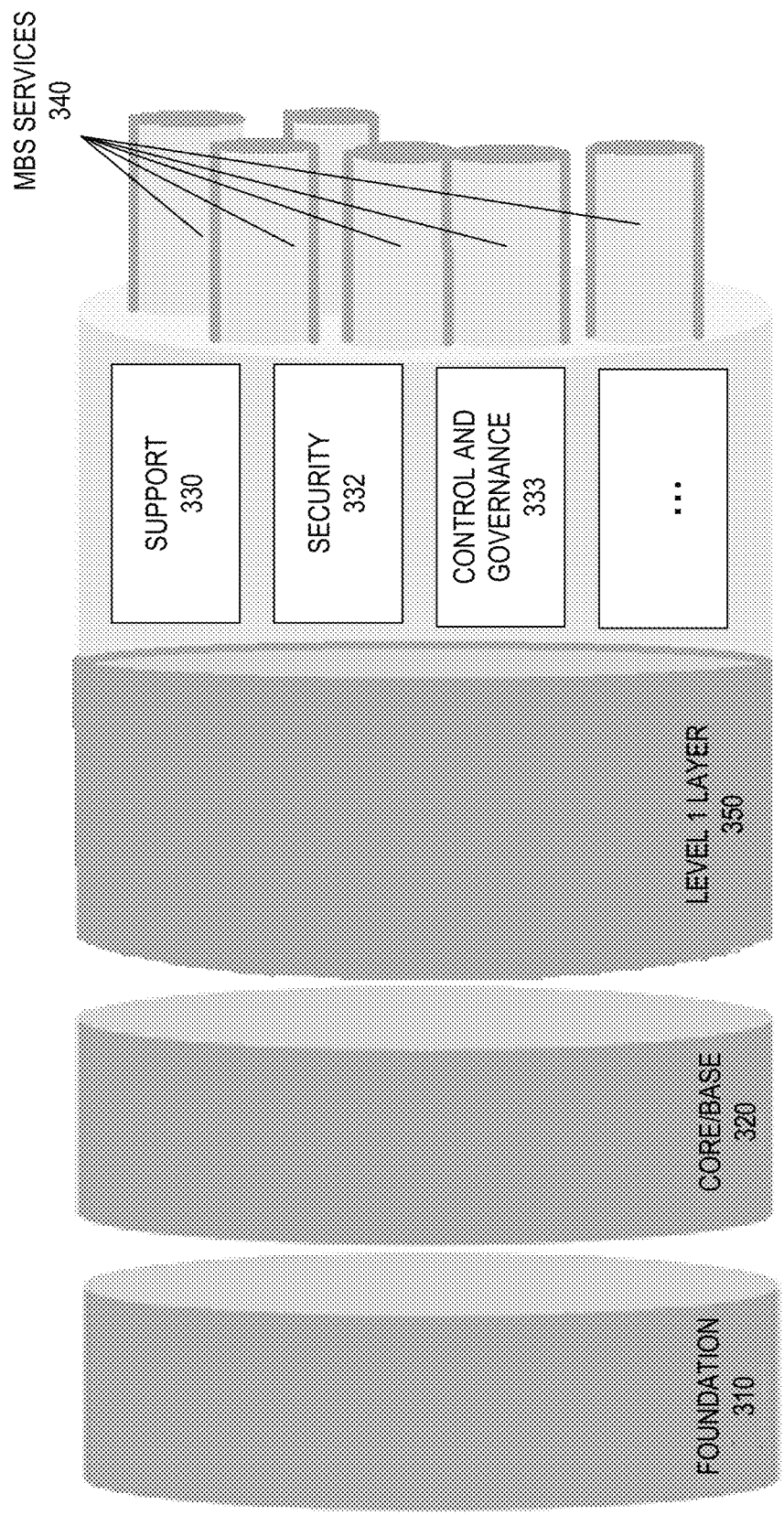
Figure 4:
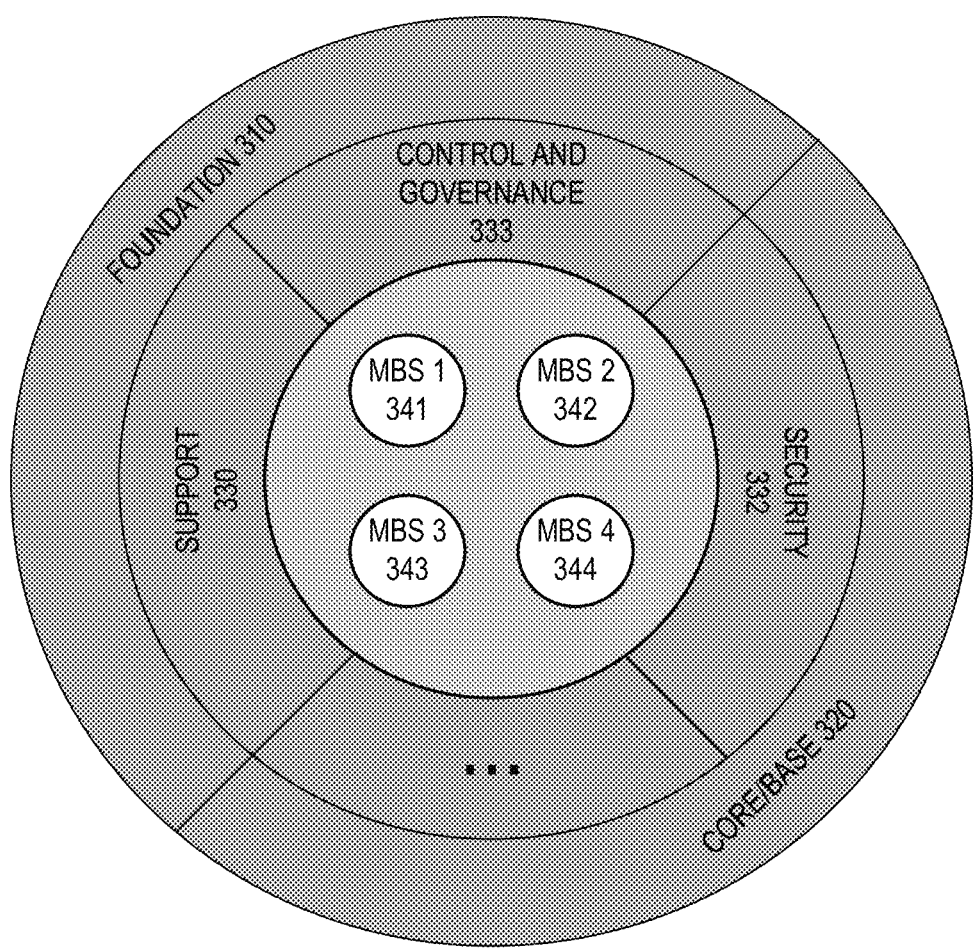
Figure 5:
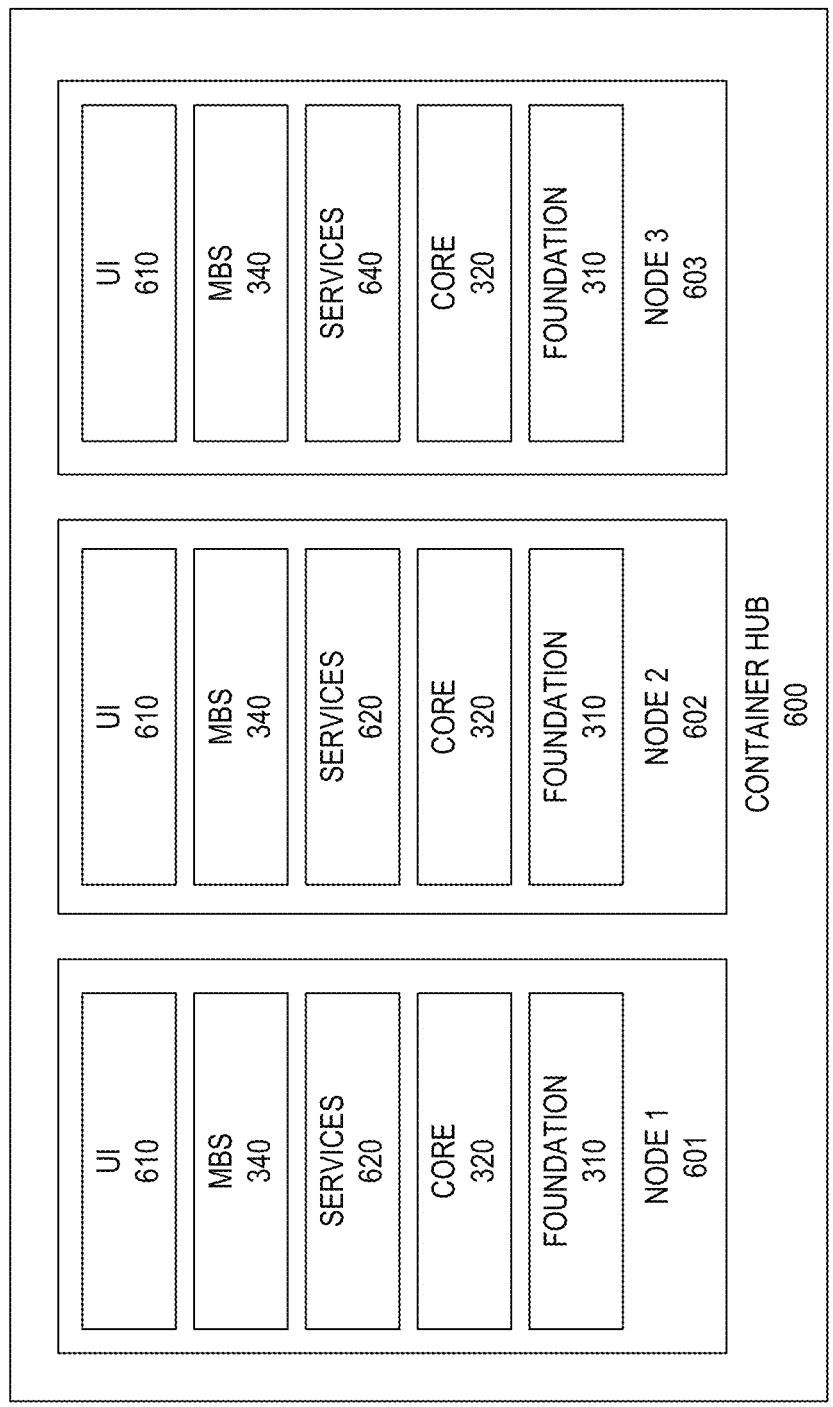
Figure 6:
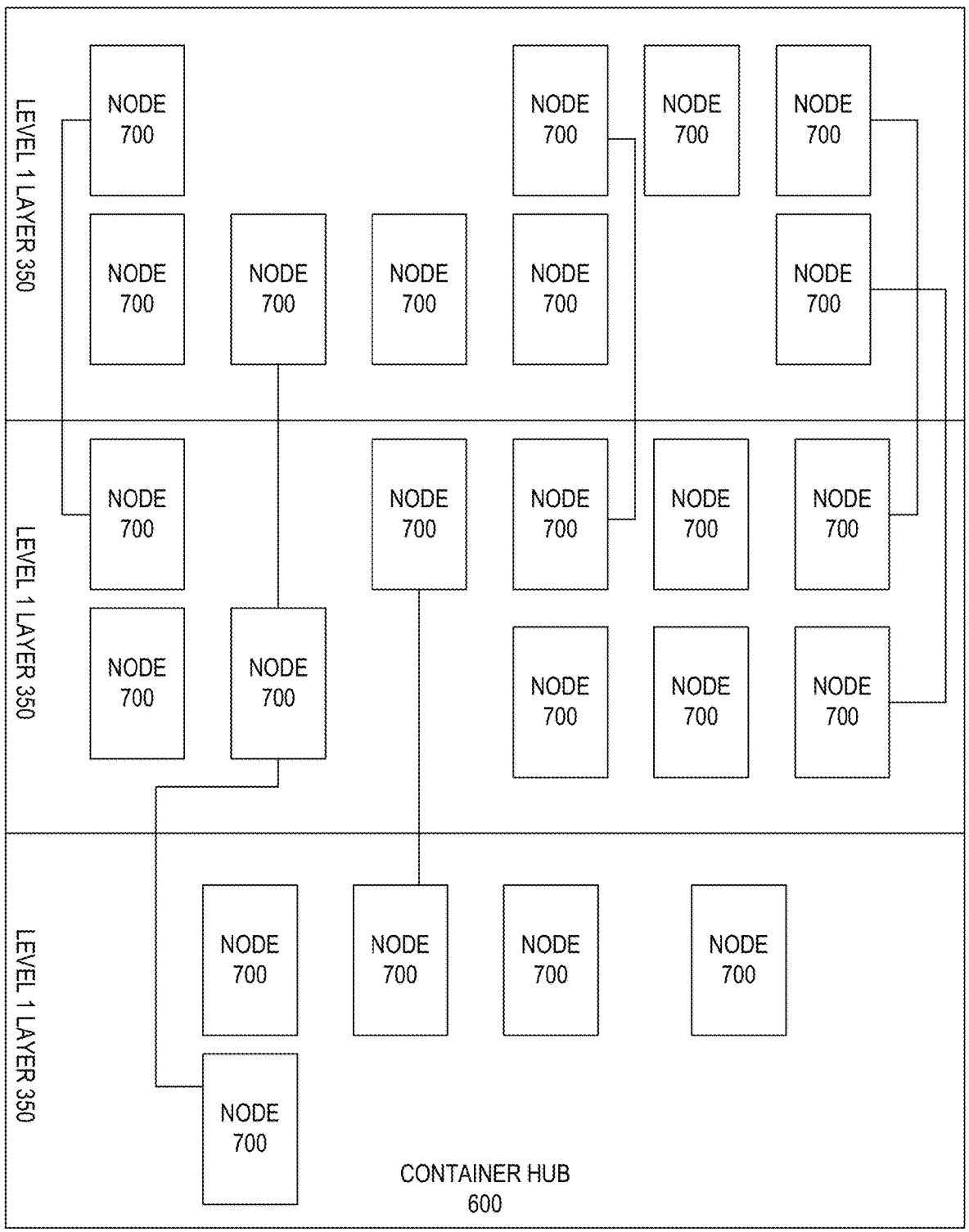

Having thus described embodiments of the invention in general terms, reference will now be made to the accompanying drawings, and wherein:

FIG. 1 illustrates a re-deployable elastic framework system environment, in accordance with embodiments of the invention;

FIG. 2 provides a block diagram of the user computer systems, in accordance with one embodiment of the invention;

FIG. 3 illustrates a side view of an exploded structural diagram for an elastic framework system environment, in accordance with one embodiment of the invention;

FIG. 4 illustrates an alternate view of the structural diagram for an elastic framework system environment, in accordance with one embodiment of the invention;

FIG. 5 depicts a block diagram of a container hub configuration, in accordance with embodiments of the present invention; and FIG. 6 represents a block diagram of an expanded container hub, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the collaborative machine learning system. In some embodiments, a user may be a computing device user, a phone user, a mobile device application user, a customer of an entity or business, a system operator, and/or employee of an entity (e.g., a financial institution). In a specific embodiment, a user may be a managing user of a population of machine learning models, wherein the system enables the user to reconfigure the population based on user-specified criteria and policies. In another specific embodiment, a user may be a customer accessing a user account via an associated user device, wherein data from an interaction between the user and an entity is analyzed or processed by the system. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, gaming devices, or any combination of the aforementioned. The device may be used by the user to access the system directly or through an application, online portal, internet browser, virtual private network, or other connection channel.

As used herein, the term "entity" may be used to include any organization or collection of users that may interact with the collaborative machine learning system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, insurance companies and the like. In other embodiments, an entity may be a business, organization, a government organization or the like that is not a financial institution.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing performance of one or more machine learning models or engines using performance metrics associated with one or more of the models. In another embodiments, monitoring may comprise identifying patterns of malfeasant or non-malfeasant activity that are correlated with one or more data points received.

As used herein, the terms "micro-business service(s)," "micro-solution(s)," "micro-service(s)," and "MBS service(s)," are each used interchangeably to refer to applications which may be deployed on the re-deployable elastic framework architecture via the use of the orchestration of one or more processing, application, and support service layers. In some embodiments, the MBS services may serve different functions, while in other embodiments, their functions may be overlapping, or require the same data or resources to support. In other embodiments, each of the MBS services may use a unique user interface to display and receive user input, which may be otherwise referred to in this application as a "UI." The term "re-deployable elastic framework system environment" may be shortened herein to simply "the system environment." It is understood that the "system environment" refers to the devices, systems and networks as shown and described with respect to FIG. 1.

FIG. 1 illustrates an re-deployable elastic framework system environment 1, in accordance with embodiments of the invention. As illustrated in FIG. 1, one or more organization systems 10 are operatively coupled, via a network 2, to one or more user computer systems 20 (e.g., authorized user systems and/or unauthorized user systems), one or more elastic framework data systems 30, one or more third-party systems 40, and/or one or more other systems (not illustrated). In this way, the one or more organization systems 10 may receive communications, including authentication credentials, or the like, from a requestor (e.g., a user 4 and/or other systems making a request) and thereafter utilize the systems and processes described herein to store data securely, control access by various requestors, and/or deterring unauthorized requestors from accessing data. It should be understood that the users 4 may be one or more associates, employees, agents, contractors, sub-contractors, third-party representatives, customers, or the like, and the systems may be the user computer systems 20, third-party systems 40, or other systems. It should be understood that the requestor may be the original requestor of data and/or an intermediary that receives the original request and accesses the various databases to access the data requested. It should be further understood that a requestor may be an authorized requestor (e.g., authorized user or system that is able to access data), or an unauthorized requestor (e.g., unauthorized user or system that has misappropriated authentication credentials of authorized requestors and/or authorized requestors that have taken data with the intent to misappropriate the data).

As such, the one or more organization systems 10 may be utilized to control access to the elastic framework data systems 30, and allow, prevent, and/or monitor usage of the elastic framework data systems 30 through communication with the one or more user computer systems 20, the one or more elastic framework data systems 30, the one or more third-party systems 40, and/or the one or more other systems, as will be discussed in further detail herein. As will be described in further detail herein, embodiments of the present invention allow for improved security and reduced storage requirements through the improved data storage techniques described herein.

The network 2 illustrated in FIG. 1, through which the systems communicate, may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more elastic framework data systems 30, the one or more third-party systems, and/or the one or more other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to monitor, communicate with, and/or take actions with respect to the authorized users and systems and/or unauthorized users and systems). In some embodiments, the one or more memory components 16 include one or more data stores 19 for storing data related to the one or more organization systems 10, including, but not limited to, data created, accessed, and/or used by the one or more organization applications 17.

As illustrated in FIG. 1, users 4 may try to access the organization systems 10 in order to store and/or access data from the one or more organization systems 10 and/or one or more elastic framework data systems 30 (e.g., any type of unsecured or secured data for which the user would like to store or access, or the like). In some cases the users 4 may be authorized users, such as users that have access to the one or more organization systems 10 and/or the one or more elastic framework data systems 30. Alternatively, the users 4 may be unauthorized users, such as users that are trying to misappropriate data from the one or more elastic framework data systems 30. The users 4 may utilize the one or more user computer systems 20 (e.g., authorized user computer systems or unauthorized user computer systems) to communicate with and/or access data from the one or more organization systems 10 and/or the one or more elastic framework data systems 30. As such, it should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, one or more memory components 26, and/or one or more user applications 27 used by any of the foregoing, such as web browsers applications, dedicated applications, specialized applications, or portions thereof. It should be understood that the one or more computer systems 20 may be systems that are internal to the organization (e.g., users are employees, or the like) or may be systems that are external to the organization (e.g., users are located outside of the organization).

The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more elastic framework data systems 30, the one or more third-party systems 40, and/or the one or more other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for one or more user applications 27, such as dedicated applications (e.g., apps, applet, or the like), portions of dedicated applications, a web browser or other applications that allow operation of the one or more user computer systems 20, and that allow users 4 to access and/or take various actions with respect to the one or more organizations systems 10 and/or the one or more elastic framework data systems 30, through the use of the one or more user computer systems 20, or the like.

As illustrated in FIG. 1, the one or more elastic framework data systems 30 may communicate with the one or more organization systems 10 and/or the one or more user computer systems 20 directly or indirectly (e.g., through the one or more organization systems 10). The one or more elastic framework data systems 30, and/or the one or more applications 37 thereof, may provide the one or more MBS services, as discussed in later figures. It should be understood that the one or more elastic framework data systems 30 may be third-party systems 40 and/or may be part of the organization systems 10. As such, the one or more elastic framework data systems 30 are operatively coupled, via a network 2, to the one or more organization systems 10, the one or more user computer systems 20, the one or more third-party systems 40, and/or the one or more other systems. The one or more elastic framework data systems 30 generally comprise one or more communication components 32, one or more processor components 34, and one or more memory components 36.

The one or more processor components 34 are operatively coupled to the one or more communication components 32, and the one or more memory components 36. The one or more processor components 34 use the one or more communication components 32 to communicate with the network 2 and other systems or components on the network 2, such as, but not limited to, the one or more organization systems 10, the one or more user computer systems 20, the one or more third-party systems 40, and/or the one or more other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

Moreover, as illustrated in FIG. 1, the one or more third-party systems 40 and/or one or more other systems (not illustrated) may be operatively coupled to the one or more organization systems 10, the one or more user computer systems 20, and/or the one or more elastic framework data systems 30, through the network 2. The one or more third-party systems 40 and/or the other systems have features that are the same as or similar to the features described with respect to the one or more organization systems 10, the one or more user computer systems 20, and/or the one or more elastic framework data systems 30 (e.g., one or more communication components, one or more processor components, and one or more memory components with computer-readable instructions of one or more applications, one or more datastores, or the like). Thus, the one or more third-party systems 40 and/or the other systems communicate with the one or more organization systems 10, the one or more user computer systems 20, the one or more elastic framework data systems 30, and/or each other in same or similar way as previously described with respect to the one or more organization systems 10, the one or more user computer systems 20, and/or the one or more elastic framework data systems 30. It should be understood that the one or more third-party systems 40 may store data, act as an intermediary, and/or interact with the various systems that may be needed for operation of the re-deployable elastic framework system environment 1 described herein.

It should be understood that when used herein, the term requestor may include any users (e.g., authorized and/or unauthorized) and/or systems (e.g., authorized or unauthorized), such as user computer systems, organization systems, third-party systems, and/or the other systems. Moreover, it should be understood that the requestor may be the user or system that is making the initial request, or the requestor may be an intermediary that receives the initial request and in turn is responsible for accessing the data from the one or more zoned database systems.

FIG. 2 provides a block diagram of the user computer systems 20, in accordance with one embodiment of the invention. The user computer systems 20 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 27. The user application 27 may then allow the user computer systems 20 to transmit and receive data and instructions from the other devices and systems of the environment 100. The user computer systems 20 comprises computer-readable instructions 236 and data storage 240 stored in the memory device 234, which in one embodiment includes the computer-readable instructions 236 of a user application 27. In some embodiments, the user application 27 allows a user 4 to access and/or interact with other systems such as the organization system(s) 10 or third-party system(s) 40. In one embodiment, the user 4 is a maintaining entity of elastic framework data systems 30, wherein the user application enables the user 4 to define policies and reconfigure the elastic framework data systems 30. In one embodiment, the user 4 is a customer of a financial entity and the user application 27 is an online banking application providing access to the entity system 120 wherein the user may interact with a user account via a user interface of the user application 27, wherein the user interactions may be provided in a data stream.

The processing device 202 may be configured to use the communication device 224 to communicate with one or more other devices on a network 101 such as, but not limited to the entity system 120 and the synthetic data generation system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user computer systems 20 may be configured to operate with one or more air interface standards, communication protocols, modulation types, and access types. By way of illustration, the user computer systems 20 may be configured to operate in accordance with any of a number of first, second, third, and/or fourth-generation communication protocols or the like. For example, the user computer systems 20 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user computer systems 20 may also be configured to operate in accordance with non-cellular communication mechanisms, such as via a wireless local area network (WLAN) or other communication/data networks. The user computer systems 20 may also be configured to operate in accordance, audio frequency, ultrasound frequency, or other communication/data networks.

The user computer systems 20 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more organization systems 10, elastic framework systems 30, or third-party systems 40 (as illustrated in FIG. 1) which are connected to the user computer systems 20. In this way, while only one of each of the organization system 10, elastic framework data system 30, and third-party system 40 is shown in FIG. 1, it is understood that multiple networked systems may make up the system environment 1.

FIG. 3 illustrates an exploded structural diagram for an elastic framework system environment, in accordance with one embodiment of the invention. As shown, the diagram in FIG. 3 includes a number of components which come together to form the complete elastic framework system. The depiction in FIG. 3 is meant to convey a relationship between lower or surrounding layers on the left, and increasingly higher or inner layers as one scans to the right of the structural diagram. This structure involves a number of layers and management shells that are situated around the MBS services. A segmented layering allows both a horizontal array and/or a vertical array, and ultimately may be envisioned using the 3-D structure shown in FIG. 3 in terms of relationships between layers and supported MBS services 340.

The concentrically layered shell structure depicted in FIG. 3 shows how the MBS services 340 are enclosed and provided with a local interface and a single connection point to an MBS layer. By having the elastic framework tightly coupled with the MBS services 340 deployed, this allows direct control over each of the MBS services 340 and a logical grouping of related services. The outer layers shown in FIG. 3 include foundation 310, and core/base 320. These layers handle basic policy tasks, networking, routing, data logging, database storage, and the like, as well as other services which are required to support inner layers, such as the MBS services 340. Foundation 310 and core/base 320 may be technology agnostic and allow for adaptation as technology progresses or changes to policies demand alteration of the MBS services 340.

Moreover, moving further to the right of the diagram, support 330, security 332, and control and governance 333 layers are shown as examples of layers that are further encapsulated by the outer layers foundation 310 and core/base 320. The support 330 layer may include a conceptual layer within the elastic framework architecture that provides a number of purposes including data access, data storage management, service usage monitoring, application programming interface (API) controls, and the like. Other separate conceptual layers in the shown embodiments may include security 332 and control and governance 333. Security 332 may house security protocols and may be updated with security information about potential or developing threats, either from outside the system or due to the nature of combined MBS services 340 and their capabilities. This layer may also include machine learning capability for intelligently analyzing the combined capabilities of the MBS services 340 employed by the elastic framework system at any given time. An additional conceptual layer is control and governance 333, which may handle the programming, storage and implementation of rules and policies for how the elastic framework architecture may be adapted and built over time.

On the far right of FIG. 3, the MBS services 340 are depicted as smaller "tubes" or cylindrical structures that are encompassed within the various layers previously described. It is understood that these cylinders may be inserted or removed from the surrounding structure, depicting the ability for multiple MBS services 340 to be added, removed, or rearranged within the elastic framework architecture. Finally, as depicted in FIG. 3, there may be one or more additional layers added to encapsulated one or more groups of MBS services 340 and their supporting services, such as level 1 layer 350. The use of one or more level 1 layers may include the encapsulation of "nodes," or a collection of the MBS services 340, shells and supporting layers, which represents a minimum deployable set of services and supporting structures, as discussed further with respect to FIG. 5.

FIG. 4 illustrates an alternate view of the structural diagram for an elastic framework system environment, in accordance with one embodiment of the invention. As opposed to the lateral side-view provided in FIG. 3, FIG. 4 shows a head-on view from the end of the elastic framework system in order to more clearly depict how the various components are encapsulated and may interrelate with one another. As shown, some of the same components from FIG. 3 are shown here in FIG. 4, including support 330, security 332, and control and governance 333 layers. Moving out yet another layer, foundation 310 and core/base 320 are also shown.

At the center of the diagram shown in FIG. 4, multiple MBS services are shown, including MBS 1 341, MBS 2 342, MBS 3 343, and MBS 4 344. These MBS services may represent a "node" or collection of MBS services 340 which all share one or more common supporting services, or one or more sets of common operation requirements from such supporting services. Alternatively, in some embodiments, the MBS services 340 included in this particular node may have different requirements from supporting services and have been determined as complementary to one another, and the MBS services 340 within the node may be communicably linked to cross-share data and processing load allotments, thereby increasing the efficiency of the system as a whole. As stated previously, one positive aspect of this arrangement is that multiple MBS services 340 may be added, removed, or rearranged within the node and the node will adapt accordingly immediately without the need for user input or reconfiguration. As such, the elastic framework system labels the MBS services 340 (e.g. MBS 1, MBS 2, MBS 3, and MBS 4) and keeps a record of the capabilities and requirements of each, as well as how these capabilities and requirements interrelate with one another and may be shared in some instances.

FIG. 5 depicts a block diagram of a container hub configuration, in accordance with embodiments of the present invention. As shown in FIG. 5, the nodes discussed previously, which may contain one or more MBS services 340 and supporting services, may further be grouped conceptually in a container hub 600. This is depicted by node 1 601, node 2 602, and node 3 603, which may all contain different or multiple different MBS services 340, as well as a record of the supporting services used to operate the MBS services 340. In addition, a "UI" or "user interface" 610 is also depicted in each node. The UI 610 is shown generally in FIG. 5 to indicate the presence of a UI for each of the nodes. However, it is noted that the UI 610 may be different for each node or for each of the MBS services 340 included in the node, depending on the type of service offered by each MBS service 340. For instance, one MBS service 340 may be directed to acceptance of resource transfer information during a resource transaction between a customer and a merchant, while another MBS service 340 may be directed to the tracking of inventory for a particular entity, merchant, and the like. While these particular services may work together and share some information, security measures, control/governance, network protocols, and backend coding logic, they may also require differing UIs in order to best interface with the user they are designed for, and they may be tailored to display specific types of information most effectively. The UI 610 may be considered yet another conceptual layer related to the operation of various MBS services 340 which may operatively link with the MBS services 340 in order to allow graphical user face (GUI) interaction between the user and the elastic framework system.

FIG. 6 represents a block diagram of an expanded container hub, in accordance with embodiments of the present invention. Shown in FIG. 6 are multiple nodes 700, which are provided as a broad representation of multiple different node structures. As described with respect to FIG. 5, the nodes each contain one or more MBS services 340, as well as the supporting service layers for these MBS services 340. The elastic framework system may track and intelligently group the MBS services 340 in different nodes 700 in order to most efficiently use system resources and in order to allow the MBS services 340 increased functionality due to the nature of their ability to share data and processing resources, as represented by the level 1 layer 350 groupings shown on the top, middle, and bottom of the container hub 600. The container hub, on the other hand, conceptually encompasses the entire outer boundary around the level 1 350 layers.

In some embodiments where the user, who may be a system administrator, desires to deploy a node 700 on the elastic framework system, the user may be unaware or unable to immediately discern how the services contained in a particular node may benefit from other nodes on the elastic framework system. In these cases, the nodes 700 may be linked automatically by the elastic framework system once the system analyzes and detects a potentially synergistic or efficient relationship between the MBS services 340, supporting services, or UIs 610 in the nodes 700. When the system detects that the MBS services 340 may benefit from a communicable link with services from other nodes 700, the elastic framework system may adjust the supporting services to achieve the desired relationship. In some embodiments, this relationship or communicable link established between nodes 700 is adaptive and transient, such that the links may be established and removed at any given time based on the resource availability, identified security patterns, or user demands associated with the system and services at any given time. In still other embodiments, the nodes 700 may be isolated due to the existence of an identified security issue that may exist in another, linked node 700. In this case, the supporting services, such as security 332 may act as an alert mechanism in order to communicate that the nodes need to isolate in a certain manner.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for a re-deployable elastic framework, the system comprising:
   one or more memory components having computer readable code stored thereon; and
   one or more processor components operatively coupled to the one or more memory components, wherein the one or more processor components are configured to execute the computer readable code to:
   generate one or more micro-business services layers, wherein the one or more micro-business services layers comprise a local interface and a single connection point for deploying one or more micro-service solutions, and wherein the one or more micro-business services layers support one or more additional layers via policy tasks including networking, routing, data logging, and database storage;
   receive one or more micro-service solutions for deployment and categorize the one or more micro-service solutions based on capabilities, data usage, and deployment requirements for the micro service solution;
   generate a node, wherein the node comprises assigning multiple of the one or more micro-service solutions to the node based on shared capabilities, data usage and shared deployment requirements;
   deploy an elastic framework, wherein the elastic framework includes the one or more micro-business services layers, one or more additional layers, and one or more node layers, wherein the node layer comprises one or more nodes;
   receive a request to add an additional micro-service solution;
   assign the additional micro-service solution to one of the one or more nodes; and
   automatically re-deploy the elastic framework, wherein the re-deployed elastic framework comprises an updated node layer.

2. The system of claim 1, wherein the one or more micro-business services layers are technology agnostic.

3. The system of claim 1, wherein the one or more additional layers further comprise a support layer, a security layer, and a control layer.

4. The system of claim 1, wherein the one or more nodes and their underlying micro-service solutions are analyzed using a machine learning algorithm to determine shared capabilities, data usage and deployment requirements.

5. The system of claim 1, wherein each of nodes may be operated either independently and in conjunction with other nodes.

6. The system of claim 1, wherein the nodes are linked together in order to share data usage and deployment requirements.

7. The system of claim 1, wherein the one or more nodes may be configured to initiate self-isolation based on the existence of an identified security condition.

8. A computer-implemented method for a re-deployable elastic framework, the computer-implemented method comprising:
   generating one or more micro-business services layers, wherein the one or more micro-business services layers comprise a local interface and a single connection point for deploying one or more micro-service solutions, and wherein the one or more micro-business services layers support one or more additional layers via policy tasks including networking, routing, data logging, and database storage;
   receiving one or more micro-service solutions for deployment and categorize the one or more micro-service solutions based on capabilities, data usage, and deployment requirements for the micro service solution;
   generating a node, wherein the node comprises assigning multiple of the one or more micro-service solutions to the node based on shared capabilities, data usage and shared deployment requirements;
   deploying an elastic framework, wherein the elastic framework includes the one or more micro-business services layers, one or more additional layers, and one or more node layers, wherein the node layer comprises one or more nodes;
   receiving a request to add an additional micro-service solution;
   assigning the additional micro-service solution to one of the one or more nodes; and automatically re-deploy the elastic framework, wherein the re-deployed elastic framework comprises an updated node layer.

9. The method of claim 8, wherein the one or more micro-business services layers are technology agnostic.

10. The method of claim 8, wherein the one or more additional layers further comprise a support layer, a security layer, and a control layer.

11. The method of claim 8, wherein the one or more nodes and their underlying micro-service solutions are analyzed using a machine learning algorithm to determine shared capabilities, data usage and deployment requirements.

12. The method of claim 8, wherein each of nodes may be operated either independently and in conjunction with other nodes.

13. The method of claim 8, wherein the nodes are linked together in order to share data usage and deployment requirements.

14. The method of claim 8, wherein the one or more nodes may be configured to initiate self-isolation based on the existence of an identified security condition.

15. A computer program product for a re-deployable elastic framework, the computer program product comprising at least one non-transitory computer-readable medium having computer-readable program code portions embodied therein, the computer-readable program code portions comprising:

an executable portion configured for generating one or more micro-business services layers, wherein the one or more micro-business services layers comprise a local interface and a single connection point for deploying one or more micro-service solutions, and wherein the one or more micro-business services layers support one or more additional layers via policy tasks including networking, routing, data logging, and database storage;

an executable portion configured for receiving one or more micro-service solutions for deployment and categorize the one or more micro-service solutions based on capabilities, data usage, and deployment requirements for the micro service solution;

an executable portion configured for generating a node, wherein the node comprises assigning multiple of the one or more micro-service solutions to the node based on shared capabilities, data usage and shared deployment requirements;

an executable portion configured for deploying an elastic framework, wherein the elastic framework includes the one or more micro-business services layers, one or more additional layers, and one or more node layers, wherein the node layer comprises one or more nodes;

an executable portion configured for receiving a request to add an additional micro-service solution;

an executable portion configured for assigning the additional micro-service solution to one of the one or more nodes; and an executable portion configured for automatically re-deploying the elastic framework, wherein the re-deployed elastic framework comprises an updated node layer.

16. The computer program product of claim 15, wherein the one or more micro-business services layers are technology agnostic.

17. The computer program product of claim 15, wherein the one or more additional layers further comprise a support layer, a security layer, and a control layer.

18. The computer program product of claim 15, wherein the one or more nodes and their underlying micro-solutions are analyzed using a machine learning algorithm to determine shared capabilities, data usage and deployment requirements.

19. The computer program product of claim 15, wherein each of nodes may be operated either independently and in conjunction with other nodes.

20. The computer program product of claim 15, wherein the one or more nodes may be configured to initiate self-isolation based on the existence of an identified security condition.

* * * * *